US012677359B2

(12) United States Patent
Hwang et al.

(10) Patent No.: US 12,677,359 B2
(45) Date of Patent: Jul. 7, 2026

(54) PULSE WIDTH MODULATION SIGNAL GENERATION CIRCUIT AND LAMP CONTROL SYSTEM INCLUDING THE SAME

(71) Applicant: LX SEMICON CO., LTD., Daejeon (KR)

(72) Inventors: Won Joon Hwang, Daejeon (KR); Nak Hun Kim, Daejeon (KR); Ji Seok Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 49 days.

(21) Appl. No.: 18/535,082

(22) Filed: Dec. 11, 2023

(65) Prior Publication Data

US 2024/0196492 A1     Jun. 13, 2024

(30) Foreign Application Priority Data

Dec. 13, 2022     (KR) ........................ 10-2022-0173354
Sep. 7, 2023     (KR) ........................ 10-2023-0118791

(51) Int. Cl.
*H05B 45/325*     (2020.01)
*B60Q 1/30*     (2006.01)
(52) U.S. Cl.
CPC ............. *H05B 45/325* (2020.01); *B60Q 1/30* (2013.01)
(58) Field of Classification Search
CPC ...... H05B 45/00; H05B 45/30; H05B 45/325; B60Q 1/30; H03K 3/017; H03K 7/08; H03K 3/0233; H03K 5/04
See application file for complete search history.

(56) References Cited

U.S. PATENT DOCUMENTS

2010/0301959 A1*  12/2010  Liu ...................... H03K 3/0231
                                                              332/109
2013/0027151 A1*   1/2013  Liu ......................... H03K 7/08
                                                              332/109

(Continued)

FOREIGN PATENT DOCUMENTS

CN          104104343 B      9/2017
CN          106059513 B   *  11/2018   ............... H03F 1/52

OTHER PUBLICATIONS

Extended European Search Report dated May 31, 2024, issued for the corresponding European patent application 23214545.8, 11 pages.

*Primary Examiner* — Thai Pham
(74) *Attorney, Agent, or Firm* — ROTHWELL, FIGG, ERNST & MANBECK, P.C.

(57)          ABSTRACT

Disclosed is a pulse width modulation signal generation circuit including a charging control circuit connected to and located between a first node connected to a capacitor and a voltage line that supplies an operating voltage, a discharging control circuit connected to and located between the first node and ground, a comparison circuit that generates a comparison signal by comparing a first reference voltage and a second reference voltage with a voltage of the first node, and a control logic circuit that generates a pulse width modulation signal whose level changes based on a level change of the comparison signal and determines a level change timing for the activation of the charging control signal and the discharging control signal using the level change of the comparison signal; and a lamp control system including the pulse width modulation signal generation circuit.

6 Claims, 7 Drawing Sheets

(56) References Cited

U.S. PATENT DOCUMENTS

2016/0315466 A1 *  10/2016  Chen ......................... G06F 1/26
2017/0013358 A1 *   1/2017  Zuo ......................... H03F 3/185
2021/0058072 A1      2/2021  Zhao

* cited by examiner

PULSE WIDTH MODULATION SIGNAL GENERATION CIRCUIT AND LAMP CONTROL SYSTEM INCLUDING THE SAME

This application claims the benefit of Korean Patent Application Nos. 10-2022-0173354 filed on Dec. 13, 2022 and 10-2023-0118791 filed on Sep. 7, 2023, all of which are hereby incorporated by reference in their entirety as if fully set forth herein BACKGROUND

FIELD

The present disclosure relates to a generation circuit of a pulse width modulation (PWM) signal.

BACKGROUND

A pulse width modulation (PWM) scheme modulates a pulse wave in a manner of adjusting a pulse width of the pulse wave. Sometimes, the PWM is also referred to as a pulse-duration modulation (PDM).

Such PWM control is a pulse control scheme that modulates the pulse width or a frequency, or both in each cycle to derive any determined output waveform.

The PWM may vary an average voltage by adjusting a duty ratio of the pulse wave to change the pulse width. By varying the pulse width in a digital form, an amplitude of an analog output is adjusted.

The duty ratio, which is also referred to as a duty or a duty cycle, refers to a ratio of a signal with a high level (or a signal that is on) in a carrier period of a PWM signal.

The output average voltage varies depending on the duty ratio. The PWM signal expressed as a repetition of the pulse waves has the same effect as outputting a DC average voltage.

When the analog output signal is output using the PWM scheme, brightness of a light-emitting diode (LED) may be adjusted, various colors may be rendered using the RGB LEDs, or a rotation speed of a DC motor may be adjusted, so that a use of the PWM signal increases in various fields.

A PWM signal generation circuit is used to generate the PWM signal as described above. A typical PWM signal generation circuit generates the PWM signal by changing a time of charging/discharging using a resistor and a capacitor outside a chip. However, when discharging the charged capacitor using the resistor, not only is there a limitation that it is difficult to secure linear characteristics, but there is also a problem in that the resistor or the capacitor affects the duty ratio depending on a temperature change.

SUMMARY

The present disclosure is to solve the above-mentioned problems, and is to provide a pulse width modulation signal generation circuit that may generate a PWM signal whose duty ratio remains constant even when an ambient temperature changes, and a lamp control system including the same.

In addition, the present disclosure is to provide a PWM signal generation circuit that may ameliorate non-linearity of a discharge voltage that affects a PWM signal, and a lamp control system including the same.

A first aspect of the present disclosure provides a pulse width modulation signal generation circuit including a charging control circuit connected to and located between a first node connected to a capacitor and a voltage line that supplies an operating voltage, wherein the charging control circuit controls a charging operation for the capacitor in response to an activated charging control signal, a discharging control circuit connected to and located between the first node and ground, wherein the discharging control circuit controls a discharging operation for the capacitor in response to an activated discharging control signal, a comparison circuit that generates a comparison signal by comparing a first reference voltage and a second reference voltage with a voltage of the first node, and a control logic circuit that generates a pulse width modulation signal whose level changes based on a level change of the comparison signal and determines a level change timing for the activation of the charging control signal and the discharging control signal using the level change of the comparison signal.

A second aspect of the present disclosure provides a lamp control system including a lamp, a lamp driving circuit that generates a pulse width modulation signal and operates the lamp using the pulse width modulation signal, and an adjustment circuit connected to the lamp driving circuit to allow a pulse width and a cycle of the pulse width modulation signal to be adjusted, wherein the adjustment circuit includes a capacitor that adjusts a voltage of a first node via a charging or discharging operation, wherein the lamp driving circuit includes a switch circuit that supplies a driving signal for operating the lamp to the lamp in response to a control signal, a pulse width modulation signal generation circuit connected to the capacitor, wherein the pulse width modulation signal generation circuit controls the charging and the discharging of the capacitor to generate the pulse width modulation signal, and a current control circuit that generates the control signal in response to the pulse width modulation signal, wherein the pulse width modulation signal generation circuit includes the first node connected to the capacitor, a charging control circuit connected to and located between a voltage line that supplies an operating voltage and the first node, and wherein the charging control circuit controls the charging operation for the capacitor in response to an activated charging control signal, a discharging control circuit connected to and located between the first node and ground, wherein the discharging control circuit controls the discharging operation for the capacitor in response to an activated discharging control signal, a comparison circuit that generates a comparison signal by comparing a first reference voltage and a second reference voltage with the voltage of the first node, and a control logic circuit that generates the pulse width modulation signal whose level changes based on a level change of the comparison signal and determines a level change timing of the charging control signal and the discharging control signal using the level change of the comparison signal.

A third aspect of the present disclosure provides a pulse width modulation signal generation circuit including a voltage to current converter that converts a predetermined voltage into a second current, a charging/discharging control circuit that generates a first current in response to a bias voltage, controls a charging operation for a capacitor connected via a first node in response to the first current and a charging control signal, and controls a discharging operation for the capacitor in response to the second current and a discharging control signal, a comparison circuit that generates a first comparison signal by comparing a first reference voltage with a voltage of the first node, and generates a second comparison signal by comparing a second reference voltage with the voltage of the first node, and a control logic circuit that generates the charging control signal and the discharging control signal using a level change of the first comparison signal and a level change of the second comparison signal, and generates a pulse width modulation signal using a level change timing of the charging control signal and a level change timing of the discharging control signal.

According to the present disclosure, the pulse width modulation signal generation circuit that may adjust the frequency and the duty ratio may generate the PWM signal whose duty ratio remains constant even when the ambient temperature changes.

In addition, according to the present disclosure, the non-linearity of the discharge voltage that affects the PWM signal may be ameliorated via the pulse width modulation signal generation circuit that may adjust the frequency and the duty ratio.

DESCRIPTION OF SPECIFIC EMBODIMENTS

Figure 1:
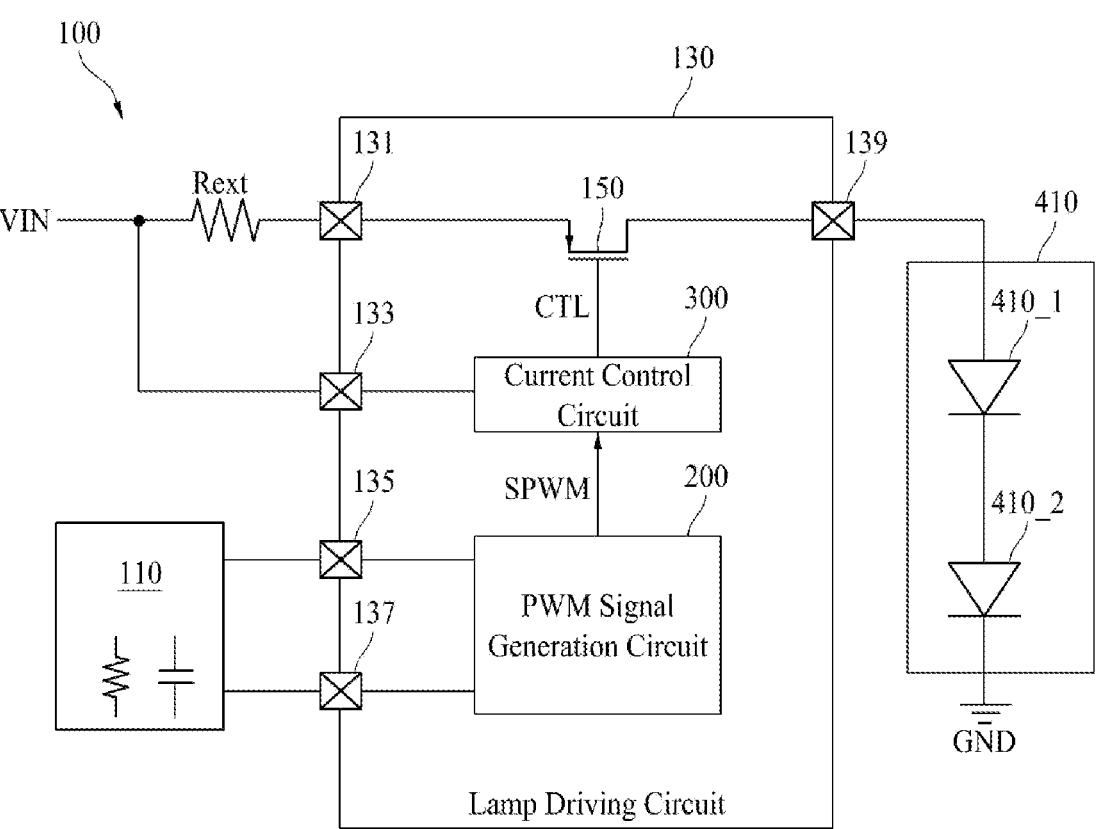
FIG. 1 is a block diagram of a lamp control system according to an embodiment of the present disclosure.

Like reference numerals refer to substantially the same components throughout the present document. In a following description, when it is not related to the core composition of the present disclosure, detailed descriptions of the composition and functions known in the technical field of the present disclosure may be omitted. The meaning of terms described herein should be understood as follows.

The advantages and features of the present disclosure, and methods for achieving them, will become clear with reference to the embodiments described in detail below along with the accompanying drawings. However, the present disclosure will not be limited to the embodiments disclosed below and will be implemented in various different forms. The present embodiments only ensure that the disclosure of the present disclosure is complete, and are provided to fully inform those skilled in the art of the present disclosure of the scope of the present disclosure. The present disclosure is only defined by the scope of the claims.

A shape, a size, a ratio, an angle, a number, and the like disclosed in the drawings for illustrating the embodiment of the present disclosure are illustrative and the present disclosure is not limited to the matters shown. Like reference numerals refer to like components throughout the present document. Additionally, in a description of the present disclosure, when it is determined that a detailed description of the related known art may unnecessarily obscure the gist of the present disclosure, the detailed description is omitted.

When the terms 'include', 'have', 'composed of', and the like mentioned herein are used, other components may be added unless the term 'only' is used. When a component is expressed in the singular, the plural case is included unless specifically stated otherwise.

When interpreting a component, it is interpreted that an error range is included even when there is no separate explicit description.

In a case of a description of a positional relationship, for example, when the positional relationship of two parts is described with 'on', 'on the top', 'under', 'next to', and the like, one or more other parts may be located between the two parts unless 'immediately' or 'directly' is used.

In descriptions of temporal relationships, for example, temporal precedent relationships between two events such as "after", "subsequent to", "before", etc., another event may occur therebetween unless "immediately" or "directly" is not indicated.

Although first, second, and the like are used to describe various components, such components are not limited by these terms. These terms are merely used to distinguish one component from another. Accordingly, the first component mentioned below may be the second component within the technical idea of the present disclosure.

The term "at least one" should be understood to include all possible combinations presented from one or more related items. For example, "at least one of first, second, and third items" may mean combinations of all items that may be presented from two or more of the first, second, and third items as well as each of the first, second, or third items.

Respective features of the various embodiments of the present disclosure may be coupled or combined with each other, partially or entirely, and various technological interconnections and operations are possible. The embodiments may be implemented independently of each other or together in a related relationship.

Hereinafter, embodiments of the present document will be described in detail with reference to the attached drawings.

FIG. 1 is a block diagram of a lamp control system according to an embodiment of the present disclosure. Referring to FIG. 1, a lamp (or light) control system 100 includes a resistor Rext, an adjustment circuit 110 including at least one capacitor and at least one resistor, a lamp driving circuit 130, and a lamp 410.

The lamp driving circuit 130 may be implemented as an integrated circuit (IC), a semiconductor chip, a field-programmable gate array (FPGA), or the like.

The lamp driving circuit 130 includes a plurality of pins 131, 133, 135, 137, and 139, a switch circuit 150, a pulse width modulation (PWM) signal generation circuit 200, and a current control circuit 300. Each of the pins 131, 133, 135, 137, and 139 may be referred to as a pad as a connection terminal.

An input voltage VIN is supplied to the first pin 131 via the resistor Rext. The input voltage VIN used as an operating voltage of the current control circuit 300 is supplied to the current control circuit 300 via the second pin 133.

The adjustment circuit 110, which includes the at least one capacitor and the at least one resistor, is connected to the PWM signal generation circuit 200 via the plurality of pins 135 and 137, so that a pulse width or a cycle of a PWM signal may be adjusted by the PWM signal generation circuit 200. Specifically, the resistor of the adjustment circuit 110 may adjust a current generated from a first current supply circuit PT1 in PWM signal generation circuits 200-1, 200-2, and 200-3 shown in FIGS. 3, 5, and 7, which will be described later, and fed back to an OP amp (operational amplifier) 210. In addition, the capacitor of the adjustment circuit 110 may allow a voltage VND1 of a first node ND1 to be adjusted in the PWM signal generation circuits 200-1, 200-2, and 200-3 shown in FIGS. 3, 5, and 7 via charging and discharging operations. Accordingly, the pulse width or the cycle of the PWM signal may be adjusted via adjustment of the resistor and the capacitance of the adjustment circuit 110.

In one embodiment, the adjustment circuit 110 may be located to be physically separated from the PWM signal generation circuit 200 to ensure ease of adjustment.

The PWM signal generation circuit 200 generates a PWM signal SPWM and outputs the signal to the current control circuit 300. The current control circuit 300 may generate a control signal CTL based on the PWM signal SPWM, and the switch circuit 150 may be turned on or off in response to the control signal CTL.

For example, the switch circuit 150 may be turned on based on the control signal CTL generated by the current control circuit 300 in response to that the PWM signal SPWM is at a high level, and may be turned off based on the control signal CTL generated by the current control circuit 300 in response to that the PWM signal SPWM is at a low level.

The switch circuit 150 controls connection of the first pin 131 and the fifth pin 139, and supplies a driving signal for driving the lamp 410 to the lamp 410 in response to the control signal CTL. In one embodiment, the switch circuit 150 may be implemented as a PMOS transistor.

The lamp 410 is connected between the fifth pin 139 and ground GND, and flickers (or is turned on/off) based on the on/off operation of the switch circuit 150. In one embodiment, the lamp 410 may be composed of a plurality of LEDs 410_1 and 410_2 connected in series or in parallel with each other.

Figure 2:
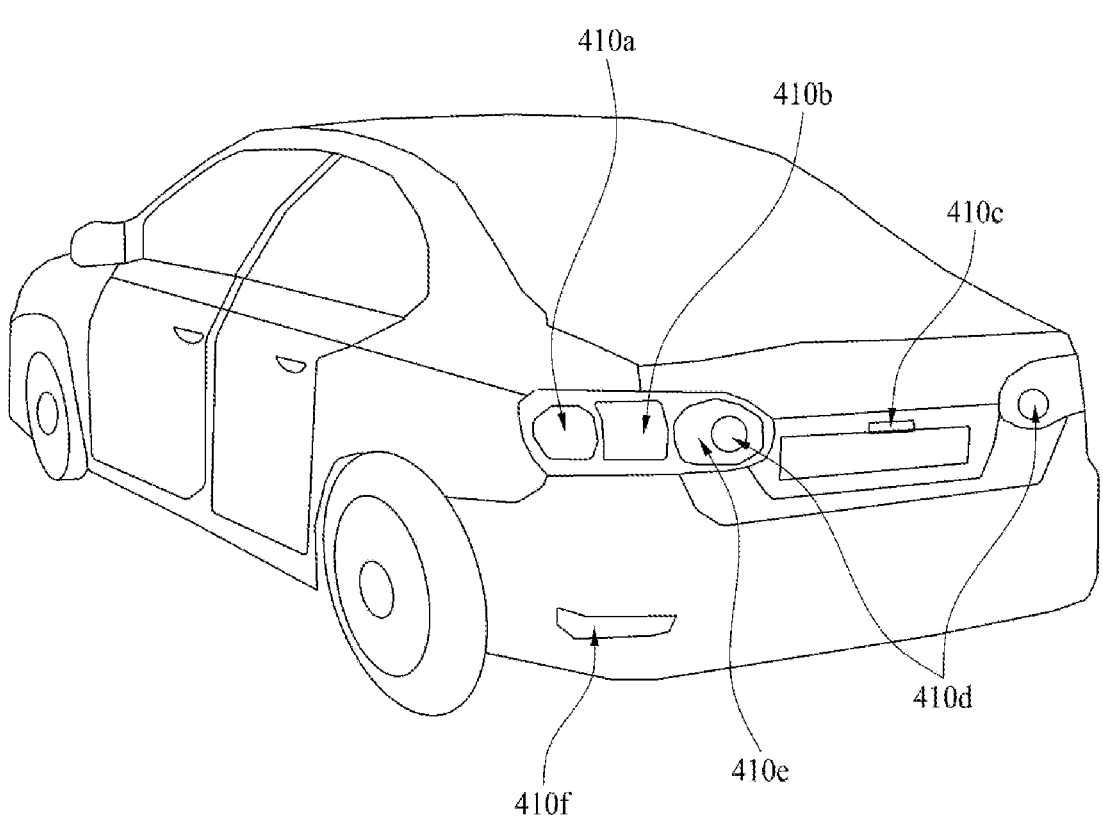
FIG. 2 is a diagram showing a vehicle rear lamp control system where a lamp control system shown in FIG. 1 is used.

In one embodiment, the lamp control system 100 described above may be included in (or installed in) a vehicle as shown as an example in FIG. 2 and control an operation of a rear lamp of the vehicle.

That is, the lamp control system 100 shown in FIG. 1 may be used as a vehicle rear lamp control system. According to such embodiment, as shown in FIG. 2, the lamp 410 may be a direction indicator or turn signal lamp 410a, a parking lamp 410b, a license plate lamp 410c, a reverse lamp 410d, a tail lamp or brake lamp 410e, or a rear fog lamp 410f.

In the above-described embodiment, for convenience of description, the PWM signal generation circuit is described as being applied to the lamp control system 100, but the PWM signal generation circuit 200 according to the present disclosure may be applied to any device that uses the PWM signal, regardless of a type thereof.

Figure 3:
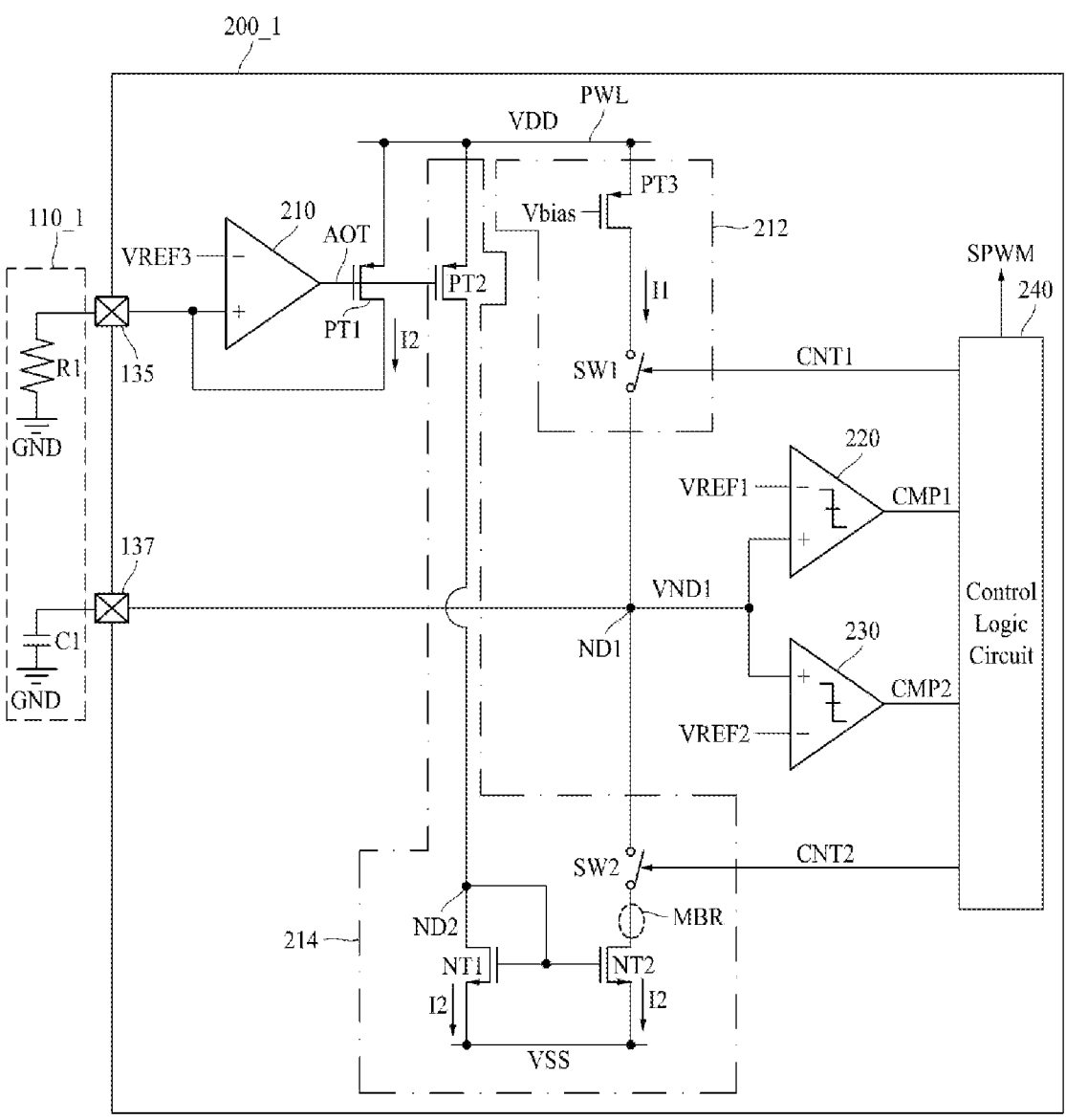
FIG. 3 is a block diagram of a PWM signal generation circuit according to an embodiment of the present disclosure.

FIG. 3 is a block diagram of a PWM signal generation circuit according to an embodiment of the present disclosure. An adjustment circuit 110_1 and a PWM signal generation circuit 200-1 shown in FIG. 3 may be examples of the adjustment circuit 110 and the PWM signal generation circuit 200 shown in FIG. 1, respectively.

In FIG. 3, for convenience of description, the adjustment circuit 110_1 including a resistor R1 and a capacitor C1, and the PWM signal generation circuit 200_1 are shown and described together. The resistor R1 is connected between the third pin 135 and the ground GND, and the capacitor C1 is connected between the fourth pin 137 and the ground GND. VSS is internal ground of the PWM signal generation circuit 200_1, GND is external ground of the PWM signal generation circuit 200_1, and the VSS and the GND are connected to each other. The third pin 135 and the fourth pin 137 are installed to be physically separated from each other.

The PWM signal generation circuit 200_1 includes the third pin 135, the fourth pin 137, the OP amp (operational amplifier) 210 also referred to as an amplifier, a current supply circuit PT1, a charging control circuit 212, a discharging control circuit 214, a first comparison circuit 220, a second comparison circuit 230, and a control logic circuit 240. The first comparison circuit 220 and the second comparison circuit 230 may constitute a comparison circuit.

A charging/discharging control circuit including the charging control circuit 212 and the discharging control circuit 214 controls a charging operation for the capacitor C1 in response to a charging control signal CNT1, and controls a discharging operation for the capacitor C1 in response to a first current (e.g., a current flowing in a current source PT2) and a discharging control signal CNT2.

In one embodiment, the resistor R1, the OP amp 210, and the current supply circuit PT1 in FIG. 3 may constitute a voltage to current converter that operates in feedback. The voltage to current converter refers to an electronic circuit that receives a voltage (e.g., a voltage of the third pin 135) as an input and generates a current (e.g., the current flowing in the current supply circuit PT1) as an output. For example, an electronic circuit that generates a current proportional to an input voltage is referred to as a VI converter.

The reason for using the voltage to current converter in the present disclosure is to define a discharge current I2, for example, the second current I2 flowing through a current mirror, using the resistor R1. For example, when a third reference voltage (or an amplifier reference voltage) VREF3 is generated inside the PWM signal generation circuit 200_1 and a resistance value of the resistor R1 is adjusted (or selected during design), the second current I2 flowing in the current supply circuit PT1 may be defined (or calculated). The PWM signal generation circuit 200_1 may determine a discharging time period (e.g., T2 in FIG. 4) using the second current I2 flowing in the current supply circuit PT1.

The OP amp 210 includes an inverting input terminal that receives a third reference voltage VREF3, a non-inverting input terminal connected to the third pin 135, and an output terminal that outputs an enable signal AOT. The OP amp 210 amplifies a difference between the third reference voltage VREF3 and a voltage of the non-inverting input terminal and outputs the enable signal AOT to a control terminal of the current supply circuit PT1 via the output terminal.

The current supply circuit PT1 is connected to and located between a voltage line PWL that supplies an operating voltage VDD and the non-inverting input terminal, and is turned on or off in response to the enable signal AOT. The current supply circuit PT1 may also be referred to as a pass transistor and may be implemented as a PMOS transistor. When the current supply circuit PT1 is the PMOS transistor, a source is connected to the voltage line PWL, a drain is connected to the non-inverting input terminal, and a gate is connected to the output terminal of the OP amp 210.

For example, the current I2 flowing in the current supply circuit PT1 is the same as a current that mirrors the current I2 flowing in the discharging control circuit 214.

The charging control circuit 212 is connected to and located between the voltage line PWL that supplies the operating voltage VDD and the first node ND1, and controls the charging operation for the capacitor C1 connected to the fourth pin 137 in response to a bias voltage Vbias and the activated charging control signal CNT1.

The charging control circuit 212 includes a current generation circuit PT3 and a charging switch SW1 connected in series with each other and located between the voltage line PWL and the first node ND1. The bias voltage Vbias is input to a gate of the PMOS transistor PT3, and the charging control signal CNT1 is input to a control terminal of the charging switch SW1. Depending on the embodiments, when the charging switch SW1 is implemented as an NMOS transistor, the control terminal may be a gate of the NMOS transistor.

The discharging control circuit 214 is connected to and located between the first node ND1 and ground VSS, and controls the discharging operation for the capacitor C1 connected to the fourth pin 137 in response to the enable signal AOT and the activated discharging control signal CNT2.

The discharging control circuit 214 includes the current source PT2 that generates the second current I2 in response to the enable signal AOT, the current mirror that mirrors the second current I2 to a mirror branch MBR, and a discharging switch SW2 that connects the first node ND1 with the mirror branch MBR in response to the activated discharging control signal CNT2. Depending on the embodiments, physical and electrical characteristics of the PMOS transistors PT1 and PT2 may be the same.

The current source PT2 corresponds to a reference current source that generates the second current I2, the current mirror generates the copy current I2, and the current mirror includes a first NMOS transistor NT1 and a second NMOS transistor NT2. The current source PT2 may be implemented as a PMOS transistor. A gate of each of the NMOS transistors NT1 and NT2 is connected to a second node ND2.

The discharging switch SW2 is connected to and located between the first node ND1 and the mirror branch MBR of the current mirror, and the discharging control signal CNT2 is input to a control terminal of the discharging switch SW2. Depending on the embodiments, when the discharging switch SW2 is implemented as an NMOS transistor, the control terminal may be a gate of the NMOS transistor.

The first comparison circuit 220 includes an inverting input terminal that receives a first reference voltage VREF1, a non-inverting input terminal connected to the first node ND1, and an output terminal that outputs a first comparison signal CMP1.

For example, it is assumed that, when the voltage VND1 of the first node ND1 is equal to or greater than the first reference voltage VREF1, the first comparison signal CMP1 output from the first comparison circuit 220 is at a high level H.

The second comparison circuit 230 includes an inverting input terminal that receives a second reference voltage VREF2, a non-inverting input terminal connected to the first node ND1, and an output terminal that outputs a second comparison signal CMP2. The first node ND1 is connected to the fourth pin 137. The first reference voltage VREF1 is greater than the second reference voltage VREF2.

For example, it is assumed that, when the voltage VND1 of the first node ND1 is equal to or greater than the second reference voltage VREF2, the second comparison signal CMP2 output from the second comparison circuit 230 is at the high level H.

The control logic circuit 240 determines a level change timing for activating the charging control signal CNT1 and the discharging control signal CNT2 using a level change (or whether the level changes) of the first comparison signal CMP1 and a level change (or whether the level has changed) of the second comparison signal CMP2, and generates the pulse width modulation signal SPWM based on the level change (or whether the level has changed) of at least one of the first comparison signal CMP1 and the second comparison signal CMP2. In this regard, the activation of the charging control signal CNT1 and the discharging control signal CNT2 means that the charging control signal CNT1 and the discharging control signal CNT2 transition from a low level to the high level, and deactivation of the charging control signal CNT1 and the discharging control signal CNT2 means that the charging control signal CNT1 and the discharging control signal CNT2 transition from the high level to the low level, but the activation and the deactivation may mean the opposite depending on the embodiment.

The level change means that a level of a signal transitions or changes from the low level to the high level or from the high level to the low level. Additionally, whether the level has changed means whether the level of the signal has transitioned. The level change timing refers to a time at which the level will change.

Figure 4:
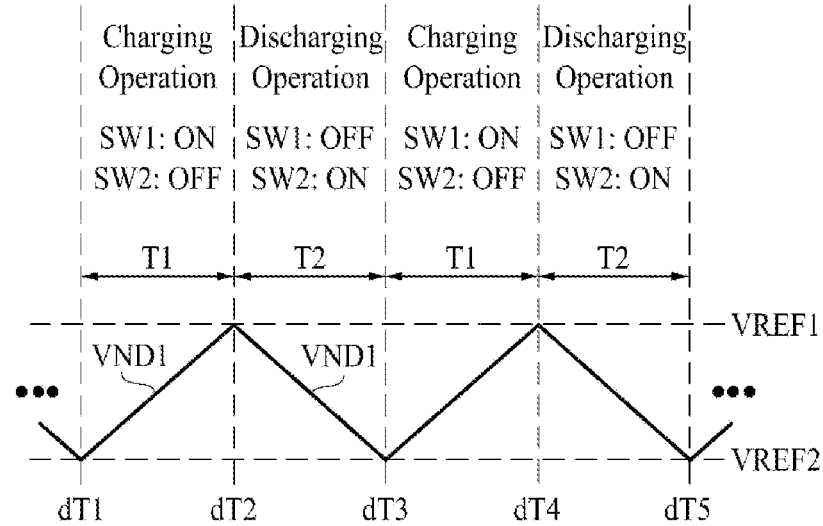
FIG. 4 is a timing diagram of signals for illustrating operations of a PWM signal generation circuit shown in FIG. 3.
Figure 4:
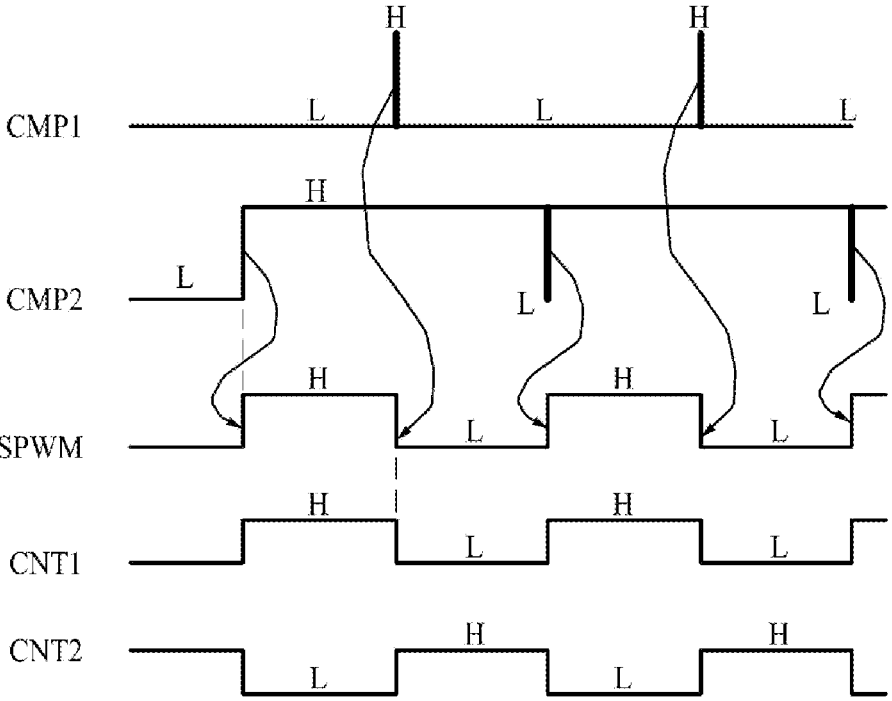

FIG. 4 is a timing diagram of signals for illustrating operations of a PWM signal generation circuit shown in FIG. 3.

Referring to FIGS. 3 and 4, it is assumed that the enable signal AOT output from the OP amp 210 is at the low level and the current generation circuit PT3 is turned on based on the bias voltage Vbias. In FIG. 4, for convenience of description, each of signals CMP1, CMP2, CMP3, SPWM, CNT1, and CNT2 may be expressed in a form of a digital signal, but each of the signals CMP1, CMP2, CMP3, SPWM, CNT1, and CNT2 may have an analog level.

During a charging time period T1 defined as a period between a first time point dT1 and a second time point dT2, for example, when the voltage VND1 of the first node ND1 is greater than the second reference voltage VREF2 and smaller than the first reference voltage VREF1, the first comparison circuit 220 outputs the first comparison signal CMP1 with a low level L and the second comparison circuit 230 outputs the second comparison signal CMP2 with the high level H. In this regard, the charging control signal CNT1 maintains the high level H, the discharging control signal CNT2 maintains the low level L, and the PWM signal SPWM maintains the high level H.

As the charging operation for the capacitor C1 is performed, the voltage VND1 of the first node ND1 increases until the second time point dT2.

At the second time point dT2, that is, when the voltage VND1 of the first node ND1 is (or becomes) greater than the first reference voltage VREF1, the first comparison circuit 220 outputs the first comparison signal CMP1 that transitions from the low level L to the high level H, and the second comparison circuit 230 outputs the second comparison signal CMP2 that maintains the high level H.

At the second time point dT2, the control logic circuit 240 outputs the PWM signal SPWM that transitions from the high level H to the low level L based on the first comparison signal CMP1 with the high level H and the second comparison signal CMP2 with the high level H.

At the second time point dT2, as the first comparison signal CMP1 transitions from the low level L to the high level H, the control logic circuit 240 generates the charging control signal CNT1 with the low level L and the discharging control signal CNT2 with the high level H.

The charging switch SW1 is turned off based on the charging control signal CNT1 with the low level L, and the discharging switch SW2 is turned on based on the discharging control signal CNT2 with the high level H. Therefore, because the second current I2 flows from the capacitor C1 to the ground VSS via a discharge path formed by the components 137, ND1, SW2, and NT2, the capacitor C1 is discharged based on the second current I2 and the voltage VND1 of the first node ND1 starts to decrease from the first reference voltage VREF1. Depending on the embodiments, a first current I1 and the second current I2 may be the same as or different from each other.

During the discharging time period T2, which is defined as a period between the second time point dT2 and a third time point dT3, for example, when the voltage VND1 of the first node ND1 starts to decrease from the first reference voltage VREF1 to the second reference voltage VREF2, the first comparison circuit 220 outputs the first comparison signal CMP1 with the low level L, and the second comparison circuit 230 outputs the second comparison signal CMP2 with the high level H. In this regard, the charging control signal CNT1 maintains the low level L, the discharging control signal CNT2 maintains the high level H, and the PWM signal SPWM maintains the low level L.

At the third time point dT3, that is, when the voltage VND1 of the first node ND1 is (or becomes) smaller than the second reference voltage VREF2, the first comparison circuit 220 outputs the first comparison signal CMP1 with the low level L, and the second comparison circuit 230 outputs the second comparison signal CMP2 that transitions from the high level H to the low level L.

At the third time point dT3, as the second comparison signal CMP2 transitions to the low level L, the control logic circuit 240 generates the PWM signal SPWM that transitions from the low level L to the high level H.

As the second comparison signal CMP2 transitions from the high level H to the low level L, the control logic circuit 240 generates the charging control signal CNT1 with the high level H and the discharging control signal CNT2 with the low level L.

Accordingly, the charging switch SW1 is turned on based on the charging control signal CNT1 with the high level H, and the discharging switch SW2 is turned off based on the discharging control signal CNT2 with the low level L. Therefore, because the first current I1 is supplied to the capacitor C1 via a charge path formed by the components PT3, SW1, ND1, and 137, the capacitor C1 is charged by the first current I1 and the voltage VND1 of the first node ND1 starts to increase again from the second reference voltage VREF2.

An operation during the charging time period T1, defined as a period between the third time point dT3 and a fourth time point dT4, is the same as the operation during the charging time period T1, defined as the period between the first time point dT1 and the second time point dT2, so that a detailed description thereof will be omitted.

At the fourth time point dT4, that is, when the voltage VND1 of the first node ND1 is equal to the first reference voltage VREF1 or is (or becomes) greater than the first reference voltage VREF1, the first comparison circuit 220 outputs the first comparison signal CMP1 that transitions from the low level L to the high level H, and the second comparison circuit 230 outputs the second comparison signal CMP2 that maintains the high level H.

As the first comparison signal CMP1 transitions from the low level L to the high level H, the control logic circuit 240 generates the PWM signal SPWM that transitions from the high level H to the low level L.

As the first comparison signal CMP1 transitions from the low level L to the high level H, the control logic circuit 240 generates the charging control signal CNT1 with the low level L and the discharging control signal CNT2 with the high level H. Therefore, the discharging operation for the capacitor C1 is performed by the PWM signal generation circuit 200_1.

An operation during the discharging time period T2, defined as a period between the fourth time point dT4 and a fifth time point dT5, is the same as the operation during the charging time period T1, defined as the period between the second time point dT2 and the fourth time point dT4, so that a detailed description thereof will be omitted.

At the fifth time point dT5, that is, when the voltage VND1 of the first node ND1 is (or becomes) smaller than the second reference voltage VREF2, the first comparison circuit 220 outputs the first comparison signal CMP1 that maintains the low level L, and the second comparison circuit 230 outputs the second comparison signal CMP2 that transitions from the high level H to the low level L.

As the second comparison signal CMP2 transitions to the low level L, the control logic circuit 240 generates the PWM signal SPWM that transitions from the low level L to the high level H.

As the second comparison signal CMP2 transitions from the high level H to the low level L, the control logic circuit 240 generates the charging control signal CNT1 with the high level H and the discharging control signal CNT2 with the low level L. Therefore, after the fifth time point dT5, the charging operation for the capacitor C1 is performed by the PWM signal generation circuit 200_1.

As shown in FIG. 4, because the charging operation changes (or changes gradually) to the discharging operation at each of the time points dT2 and dT4, the first comparison circuit 220 generates the first comparison signal CMP1 with the high level H only for a very short time. In addition, because the discharging operation changes (or changes instantaneously) to the charging operation at each of the time points dT1, dT3, and dT5, the second comparison circuit 230 generates the second comparison signal CMP2 with the low level L only for a very short time.

The control logic circuit 240 determines the level change (or whether the level has changed) of the first comparison signal CMP1 and the level change (or whether the level has changed) of the second comparison signal CMP2, and determines a level (or state) change timing of the charging control signal CNT1 for controlling the charging operation and a level (or state) change timing of the discharging control signal CNT2 for controlling the discharge operation based on the determination result.

In addition, the control logic circuit generates the PWM signal SPWM by determining a level change timing of the PWM signal SPWM based on the level change (or whether the level has changed) of the first comparison signal CMP1 and the level change (or whether the level has changed) of the second comparison signal CMP2. That is, the control logic circuit 240 may generate the PWM signal SPWM by allowing a level of the PWM signal SPWM to change whenever the level of one of the first comparison signal CMP1 and the second comparison signal CMP2 changes.

In one embodiment, the control logic circuit 240 may determine the charging time period T1 according to Mathematical Formula 1 below.

$$T1 = \frac{[C*(VREF1 - VREF2)]}{I1} \qquad \text{[Mathematical Formula 1]}$$

Here, the charging time period T1 refers to a pulse width (a high period or an on period) of the PWM signal SPWM, C refers to a capacitance of the capacitor C1, and I1 refers to a current or an amount of current generated by the current generation circuit PT3.

The control logic circuit 240 may determine the discharging time period T2 according to Mathematical Formula 2 below.

$$T2 = \frac{[C*(VREF1 - VREF2)]}{I2} \qquad \text{[Mathematical Formula 2]}$$
$$= \frac{[C*(VREF1 - VREF2)]}{[VREF3/R]}$$

Here, the discharging time period T2 refers to a low period or an off period of the PWM signal SPWM, R refers to the resistance value of the resistor R1, and I2 refers to a current or an amount of current flowing in the current supply circuit PT1 or the current mirror.

The control logic circuit 240 may determine a frequency fPWM of the PWM signal SPWM according to Mathematical Formula 3 below.

$$f_{PWM}=1/(T1+T2) \qquad \text{[Mathematical Formula 3]}$$

The control logic circuit 240 may determine a duty ratio DuR of the PWM signal SPWM according to Mathematical Formula 4 below.

$$DuR=T1/(+T2) \qquad \text{[Mathematical Formula 4]}$$

According to such embodiment, the control logic circuit 240 may adjust the pulse width or the duty ratio of the PWM signal SPWM by adjusting the charging time period T1 and the discharging time period T2.

Operating voltages of the components 210, 220, and 230 are the VDD and the VSS.

Figure 5:
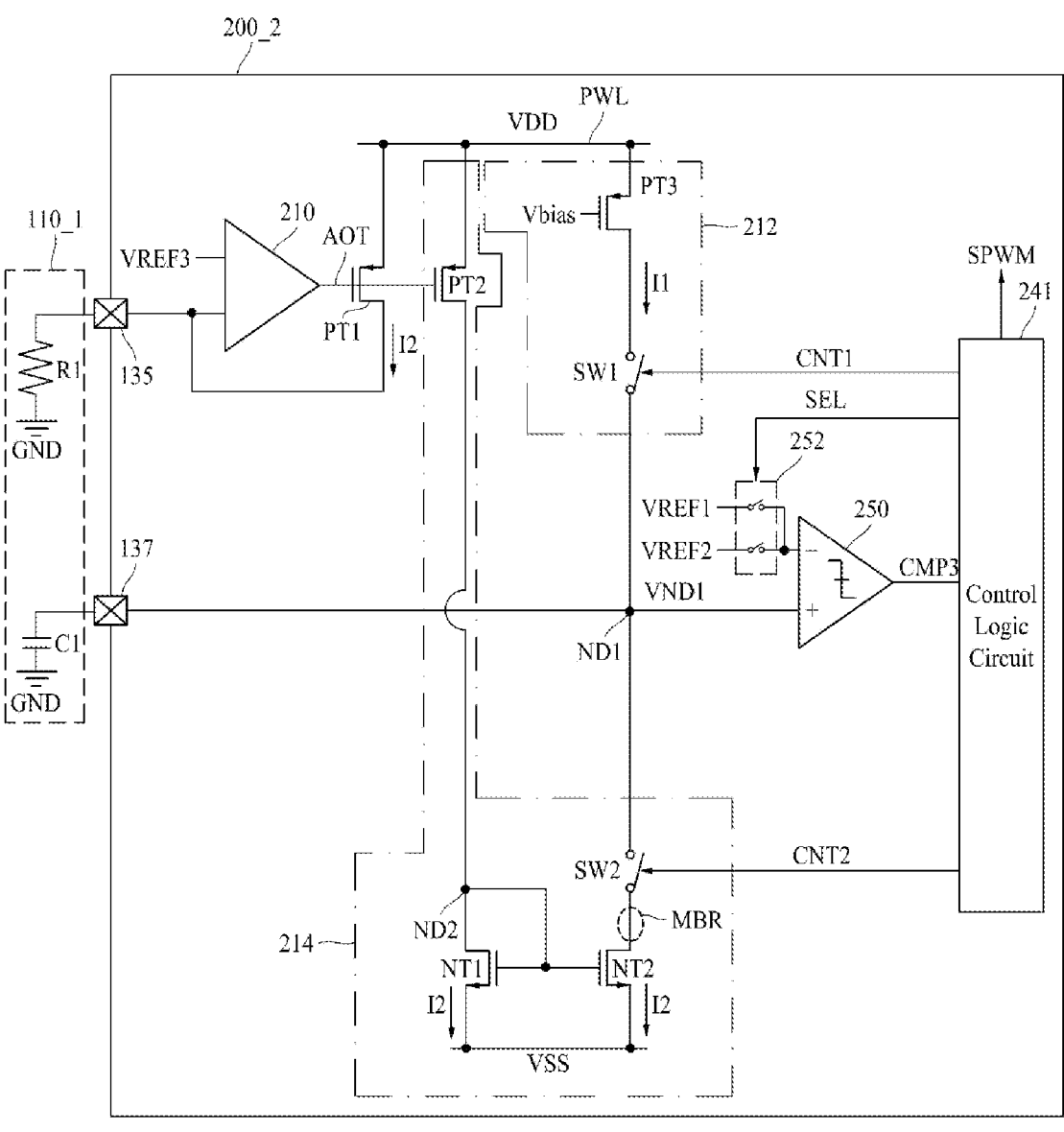
FIG. 5 is a block diagram of a PWM signal generation circuit according to another embodiment of the present disclosure.

FIG. 5 is a block of a PWM signal generation circuit according to another embodiment of the present disclosure. The adjustment circuit 110_1 and the PWM signal generation circuit 200-2 shown in FIG. 5 may be examples of the adjustment circuit 110 and the PWM signal generation circuit 200 shown in FIG. 1, respectively.

In FIG. 5, for convenience of description, the adjustment circuit 110_1 including the resistor R1 and the capacitor C1 and the PWM signal generation circuit 200_2 are shown and described together.

The PWM signal generation circuit 200_2 includes the third pin 135, the fourth pin 137, the OP amp 210, the current supply circuit PT1, the charging control circuit 212, the discharging control circuit 214, a third comparison circuit 250, a selection circuit 252, and a control logic circuit 241. The third comparison circuit 250 and the selection circuit 252 may constitute the comparison circuit.

In one embodiment, the resistor R1, the OP amp 210, and the current supply circuit PT1 in FIG. 5 may constitute the voltage to current converter. As described with reference to FIG. 3, the reason for using the voltage to current converter in the present disclosure is to define the discharge current I2, for example, the second current I2 flowing in the current mirror, using the resistor R1. The PWM signal generation circuit 2002 may determine the discharging time period (e.g., T2 in FIG. 6) using the second current I2 flowing in the current supply circuit PT1.

Because a structure and an operation of each of the components 210, PT1, PT2, 212, and 214 shown in FIG. 5 are the same as the structure and the operation of each of the components 210, PT1, PT2, 212, and 214 shown in FIG. 3, a detailed description thereof will be omitted.

The selection circuit 252 outputs one of the first reference voltage VREF1 and the second reference voltage VREF2 to an inverting input terminal of the third comparison circuit 250 based on a selection signal SEL output from the control logic circuit 241. In one embodiment, the selection circuit 252 may be a multiplexer.

The third comparison circuit 250 includes the inverting input terminal that receives the output signal VREF1 or VREF2 of the selection circuit 252, a non-inverting input terminal connected to the first node ND1, and an output terminal that outputs the comparison signal CMP3.

The control logic circuit 241 uses a level change (or whether the level has changed) of the comparison signal CMP3 to generate a level change timing of the charging control signal CNT1 for controlling the charging operation, a level change timing of the discharging control signal CNT2 for controlling the discharging operation, and the selection signal SEL.

Additionally, the control logic circuit 241 determines the level of the PWM signal SPWM based on the level change (or whether the level has changed) of the comparison signal CMP3. For example, the control logic circuit 241 generates the PWM signal SPWM by determining the level change timing of the PWM signal SPWM based on the level change (or whether the level has changed) of the comparison signal CMP3. That is, the control logic circuit 241 may generate the PWM signal SPWM by allowing the level of the PWM signal SPWM to change whenever the level of the comparison signal CMP3 changes. In one embodiment, the control logic circuit 241 may generate the PWM signal SPWM such that a phase thereof is opposite to that of the comparison signal CMP3.

Figure 6:
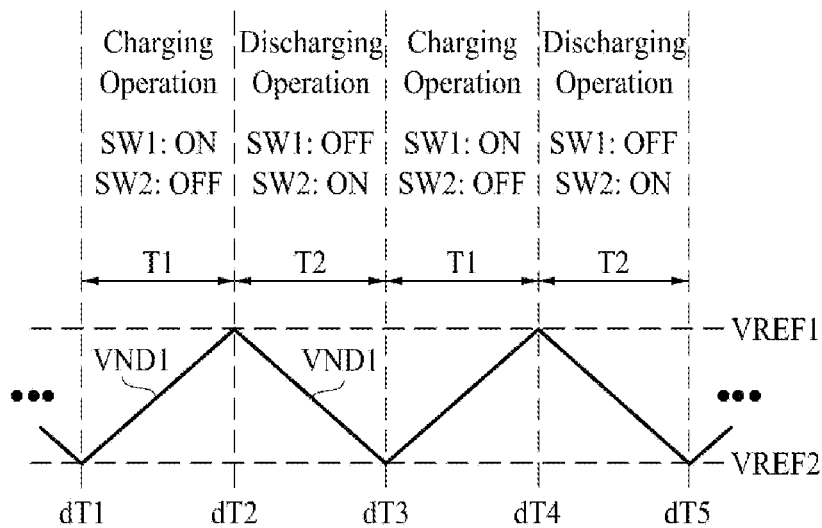
FIG. 6 is a timing diagram of signals for illustrating operations of a PWM signal generation circuit shown in FIG. 5.
Figure 6:
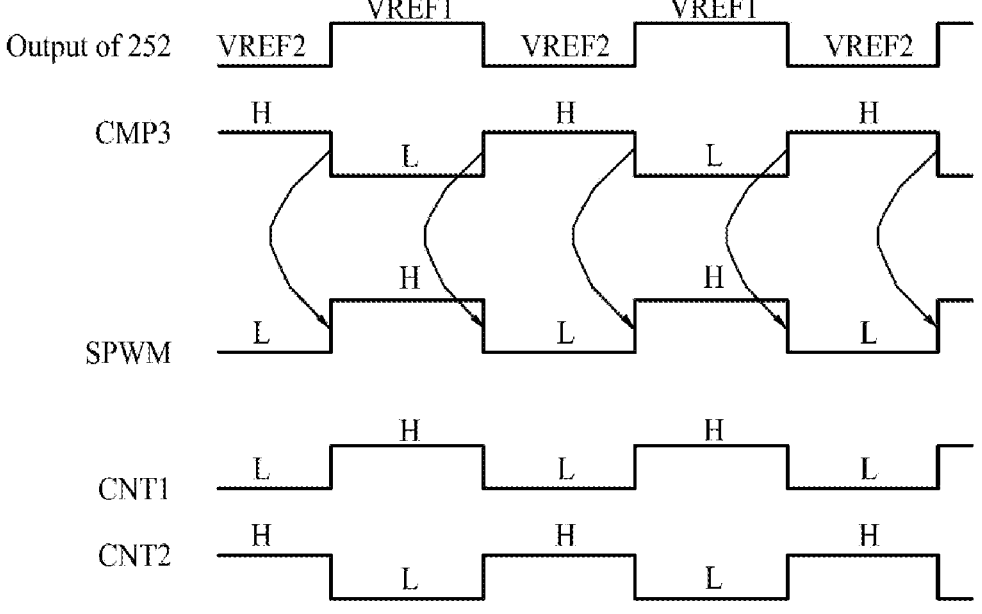

FIG. 6 is a timing diagram of signals for illustrating operations of a PWM signal generation circuit shown in FIG. 5.

Referring to FIGS. 5 and 6, it is assumed that the enable signal AOT of the OP amp 210 is at the low level L, the current generation circuit PT3 is turned on based on the bias voltage Vbias, and the selection circuit 252 outputs the second reference voltage VREF2 in response to the selection signal SEL with the high level H.

In FIG. 6, for convenience of description, each of the signals CMP3, SPWM, CNT1, and CNT2 is expressed in the form of the digital signal, but each of the signals CMP3, SPWM, CNT1, and CNT2 may have the analog level.

Depending on the embodiments, the control logic circuit 241 may include a register for storing a state value (or a logic value) that determines the level of each of the control signals CNT1, CNT2, and SEL.

Because the enable signal AOT of the OP amp 210 is at the low level L, each of the PMOS transistors PT1 and PT2 is turned on.

It is assumed that, at the first time point dT1, that is, when the voltage VND1 of the first node ND1 is (or becomes) smaller than the second reference voltage VREF2, the third comparison circuit 250 outputs the comparison signal CMP3 that transitions from the high level H to the low level L, and the control logic circuit 241 outputs the pulse width modulation signal SPWM that transitions from the low level L to the high level H, the charging control signal CNT1 that transitions from the low level L to the high level H, and the discharging control signal CNT2 that transitions from the high level H to the low level L.

Additionally, the control logic circuit 241 generates the selection signal SEL with the low level L based on the comparison signal CMP3 that transitions from the high level H to the low level L and outputs the generated signal to the selection circuit 252. The selection circuit 252 outputs the first reference voltage VREF1 to the inverting input terminal of the third comparison circuit 250 based on the selection signal SEL with the low level L.

During the charging time period T1 defined by the first time point dT1 and the second time point dT2, the comparison signal CMP3 maintains the low level L, so that the charging control signal CNT1 maintains the high level H and the discharging control signal CNT2 maintains the low level L. Therefore, the charging operation for the capacitor C1 is performed. During the charging time period T1, the pulse width modulation signal SPWM maintains the high level H.

At the second time point dT2, that is, when the voltage VND1 of the first node ND1 is (or becomes) greater than the first reference voltage VREF1, the third comparison circuit 250 outputs the comparison signal CMP3 that transitions from the low level L to the high level H.

The control logic circuit 241 generates the charging control signal CNT1 with the low level L and the discharging control signal CNT2 with the high level H based on the comparison signal CMP3 that transitions from the low level L to the high level H.

Additionally, the control logic circuit 241 generates the selection signal SEL with the high level H based on the comparison signal CMP3 that transitions from the low level L to the high level H and outputs the generated signal to the selection circuit 252. The selection circuit 252 outputs the second reference voltage VREF2 to the inverting input terminal of the third comparison circuit 250 based on the selection signal SEL with the high level H.

Additionally, the control logic circuit 241 generates the PWM signal SPWM that transitions from the high level H to the low level L based on the comparison signal CMP3 that transitions from the low level L to the high level H.

The charging switch SW1 is turned off based on the charging control signal CNT1 with the low level L, and the discharging switch SW2 is turned on based on the discharging control signal CNT2 with the high level H. Therefore, because the second current I2 flows from the capacitor C1 to the ground VSS via the discharge path formed by the components 137, ND1, SW2, and NT2, the capacitor C1 is discharged, and the voltage VND1 of the first node ND1 decreases from the first reference voltage VREF1.

During the discharging time period T2, which is defined as the period between the second time point dT2 and the third time point dT3, for example, when the voltage VND1 of the first node ND1 decreases from the first reference voltage VREF1 to the second reference voltage VREF2, the third comparison circuit 250 outputs the comparison signal CMP3 that maintains the high level H.

At the third time point dT3, that is, when the voltage VND1 of the first node ND1 is (or becomes) smaller than second reference voltage VREF2, the third comparison circuit 250 outputs the comparison signal CMP3 that transitions from the high level H to the low level L.

The control logic circuit 241 generates the selection signal SEL with the low level L based on the comparison signal CMP3 that transitions from the high level H to the low level L and outputs the generated signal to the selection circuit 252. The selection circuit 252 outputs the first reference voltage VREF1 to the inverting input terminal of the third comparison circuit 250 based on the selection signal SEL with the low level L.

Additionally, the control logic circuit 241 generates the charging control signal CNT1 with the high level H and the discharging control signal CNT2 with the low level L based on the comparison signal CMP3 that transitions from the high level H to the low level L.

Additionally, the control logic circuit 241 generates the PWM signal SPWM that transitions from the low level L to the high level H based on the comparison signal CMP3 that transitions from the high level H to the low level L.

The charging switch SW1 is turned on based on the charging control signal CNT1 with the high level H, and the discharging switch SW2 is turned off based on the discharging control signal CNT2 with the low level L. Therefore, because the first current I1 is supplied to the capacitor C1 via the charging path formed by the components PT3, SW1, ND1, and 137, the capacitor C1 is charged and the voltage VND1 of the first node ND1 starts to increase from the second reference voltage VREF2.

Because an operation during the charging time period T1, defined as the period between the third time point dT3 and the fourth time point dT4, is the same as the operation during the charging time period T1 defined with the first time point dT1 and the second time point dT2, a detailed description thereof will be omitted.

At the fourth time point dT4, that is, when the voltage VND1 of the first node ND1 is (or becomes) greater than the first reference voltage VREF1, the third comparison circuit 250 outputs the comparison signal CMP3 with the high level H.

The control logic circuit 241 outputs the selection signal SEL with the high level H to the selection circuit 252 based on the comparison signal CMP3 that transitions from the low level L to the high level H, and generates the charging control signal CNT1 with the low level L and the discharging control signal CNT2 with the high level H. The selection circuit 252 outputs the second reference voltage VREF2 to the inverting input terminal of the third comparison circuit 250 based on the selection signal SEL with the high level H.

Additionally, the control logic circuit 241 generates the PWM signal SPWM that transitions from the high level H to the low level L based on the comparison signal CMP3 that transitions from the low level L to the high level H.

An operation during the discharging time period T2, defined as the period between the fourth time point dT4 and the fifth time point dT5, is the same as the operation during the discharging time period T2 defined with the second time point dT2 and the third time point dT3, so that a detailed description thereof will be omitted.

At the fifth time point dT5, that is, when the voltage VND1 of the first node ND1 is (or becomes) smaller than the second reference voltage VREF2, the third comparison circuit 250 outputs the comparison signal CMP3 that transitions from the high level H to the low level L.

The control logic circuit 241 generates the selection signal SEL with the low level L based on the comparison signal CMP3 that transitions from the high level H to the low level L and outputs the generated signal to the selection circuit 252. The selection circuit 252 outputs the first reference voltage VREF1 to the inverting input terminal of the third comparison circuit 250 based on the selection signal SEL with the low level L.

The control logic circuit 241 generates the charging control signal CNT1 with the high level H and the discharging control signal CNT2 with the low level L based on the comparison signal CMP3 that transitions from the high level H to the low level L.

Additionally, the control logic circuit 241 generates the PWM signal SPWM that transitions from the low level L to the high level H based on the comparison signal CMP3 that transitions from the high level H to the low level L.

As described above, the control logic circuit 241 determines the levels (or the level change timings) of the respective control signals CNT1 and CNT2 for controlling the charging and discharging operations using the level change (or whether the level has changed) of the comparison signal CMP3, and generates the PWM signal SPWM corresponding to the result thereof.

According to such embodiment, the charging time period T1 may be determined according to Mathematical Formula 1 above, the discharging time period T2 may be determined according to Mathematical Formula 2 above, the frequency fPWM of the PWM signal SPWM may be determined according to Mathematical Formula 3 above, and the duty ratio DuR of the PWM signal SPWM may be determined according to Mathematical Formula 4 above.

Figure 7:
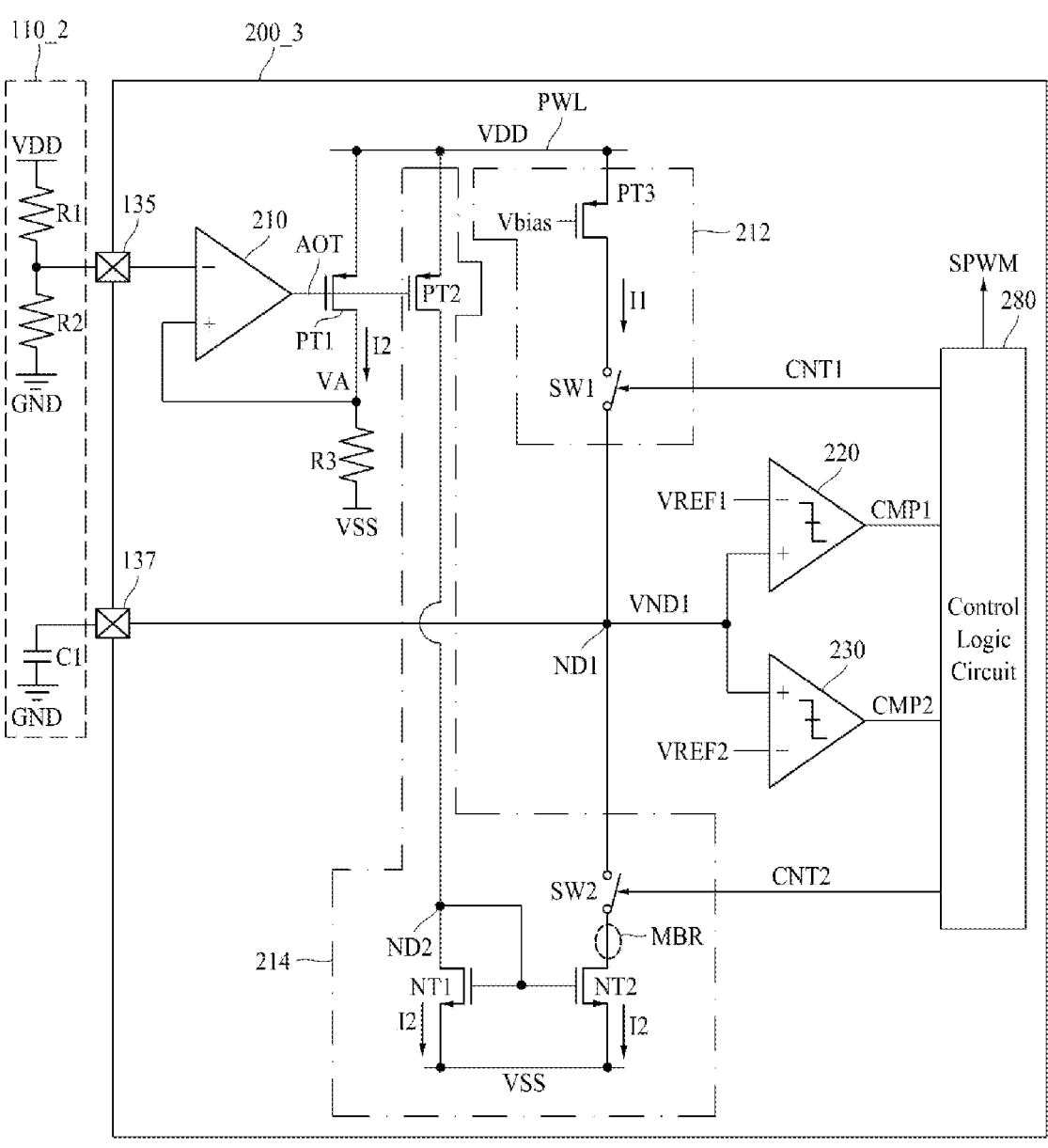
FIG. 7 is a block diagram of a PWM signal generation circuit according to another embodiment of the present disclosure.

FIG. 7 is a block diagram of a PWM signal generation circuit according to another embodiment of the present disclosure. An adjustment circuit 110_2 and a PWM signal generation circuit 200-3 shown in FIG. 7 may be examples of the adjustment circuit 110 and the PWM signal generation circuit 200 shown in FIG. 1, respectively.

In FIG. 7, for convenience of description, the adjustment circuit 110_2 including the first resistor R1, a second resistor R2, and the capacitor C1, and the PWM signal generation circuit 200_3 are shown and described together. The first resistor R1 and the second resistor R2 may constitute a resistance circuit. The first resistor R1 is connected to and located between the third pin 135 and the voltage line PWL that supplies the operating voltage VDD, the second resistor R2 is connected to and located between the third pin 135 and the ground GND, and the capacitor C1 is connected to and located between the fourth pin 137 and the ground GND.

In one embodiment, the first and second resistors R1 and R2, the OP amp 210, the current supply circuit PT1, and an internal resistor R3 may constitute the voltage to current converter. As described with reference to FIG. 3, the PWM signal generation circuit 200_1 may determine the discharging time period (e.g., T2 in FIGS. 4 and 6) using the second current I2 flowing in the current supply circuit PT1.

Except that the inverting input terminal of the OP amp 210 is connected to the third pin 135 and the internal resistor R3 is connected to and located between the non-inverting input terminal of the OP amp 210 and the ground VSS, a structure and an operation of the PWM signal generation circuit 200_3 shown in FIG. 7 are the same as the structure and the operation of the PWM signal generation circuit 200_1 shown in FIG. 3.

The current supply circuit PT1 is connected to and located between the voltage line PWL and the internal resistor R3, and a voltage VA of the non-inverting input terminal of the OP amp 210 is determined based on the internal resistor R3 and the second current I2. Referring to FIG. 7, the voltage of the inverting input terminal of the OP amp 210 is determined based on voltage distribution of the resistors R1 and R2.

A conceptual timing diagram of the PWM signal generation circuit 200_3 shown in FIG. 7 is the same as the timing diagram shown in FIG. 4. However, the discharging time period T2 of the PWM signal generation circuit 200_3 shown in FIG. 7 may be determined according to Mathematical Formula 5 below.

$$T2 = [C*(VREF1 - VREF2)]/I2 \qquad \text{[Mathematical Formula 5]}$$
$$= \frac{[C*(VREF1 - VREF2)]}{[VDD*(RV2/(RV1+RV2))/RV3]}$$

In Mathematical Formula 5, C refers to the capacitance of the capacitor C1, RV1 refers to the resistance value of the first resistor R1, RV2 refers to a resistance value of the second resistor R2, RV3 refers to a resistance value of the internal resistor R3, VREF1 refers to the first reference voltage, VREF2 refers to the second reference voltage, and VDD refers to the operating voltage.

In the PWM signal generation circuit 200_3 shown in FIG. 7, the charging time period T1 may be determined according to Mathematical Formula 1 above, the frequency fPWM of the PWM signal SPWM may be determined according to Mathematical Formula 3 above, and the duty ratio DuR of the PWM signal SPWM may be determined according to Mathematical Formula 4 above.

Those skilled in the art of the technical field to which the present disclosure belongs will understand that the above-described present disclosure may be implemented in other specific forms without changing a technical idea or essential features thereof.

Therefore, the embodiments described above should be understood in all respects as illustrative and not restrictive. The scope of the present disclosure is indicated by the patent claims to be described later rather than the detailed description above, and the meaning and the scope of the patent claims and all changes or modified forms derived from the equivalent concept thereof should be interpreted to be included in the scope of the present disclosure.

What is claimed is:

1. A pulse width modulation signal generation circuit comprising:

a charging control circuit connected to and located between a first node connected to a capacitor and a voltage line configured to supply an operating voltage, wherein the charging control circuit is configured to control a charging operation for the capacitor in response to an activated charging control signal;

a discharging control circuit connected to and located between the first node and ground, wherein the discharging control circuit is configured to control a discharging operation for the capacitor in response to an activated discharging control signal;

a comparison circuit configured to generate a comparison signal by comparing a first reference voltage and a second reference voltage with a voltage of the first node;

an amplifier configured to generate an enable signal by amplifying a difference between a third reference voltage applied to an inverting terminal and a voltage applied to a non-inverting terminal;

a current supply circuit connected to an output terminal of the amplifier, wherein the current supply circuit is configured to feed back a third current to the non-inverting terminal in response to the enable signal; and a control logic circuit configured to generate a pulse width modulation signal whose level changes based on a level change of the comparison signal and determine a level change timing for activation of the charging control signal and the discharging control signal using the level change of the comparison signal.

2. The pulse width modulation signal generation circuit of claim 1, wherein the comparison circuit includes:

a first comparison circuit configured to compare the first reference voltage with the voltage of the first node to generate a first comparison signal; and a second comparison circuit configured to compare the second reference voltage with the voltage of the first node to generate a second comparison signal, and wherein the control logic circuit is configured to change the level of the pulse width modulation signal whenever a level of one of the first comparison signal and the second comparison signal changes.

3. The pulse width modulation signal generation circuit of claim 1, wherein the charging control circuit is configured to control the charging operation for the capacitor in response to a bias voltage and the activated charging control signal, and includes;

a current generation circuit configured to generate a first current in response to the bias voltage; and a charging switch configured to supply the first current to the capacitor in response to the activated charging control signal such that the capacitor is charged with the first current, and wherein the discharging control circuit is configured to control the discharging operation for the capacitor in response to the enable signal and the activated discharging control signal, and includes:

a current source configured to generate a second current in response to the enable signal;

a current mirror configured to mirror the second current to a mirror branch; and a discharging switch configured to connect the first node with the mirror branch in response to the activated discharging control signal.

4. The pulse width modulation signal generation circuit of claim 1, wherein the third current fed back to the non-inverting terminal is adjusted by a resistor connected to and located between the non-inverting terminal and the ground, and wherein a current amount of a second current and a current amount of the third current are equal to each other.

5. The pulse width modulation signal generation circuit of claim 1, further comprising:

a third resistor connected to and located between the non-inverting terminal and the ground, wherein the third current is adjusted by a resistance circuit connected to the inverting terminal, wherein the resistance circuit includes:

a first resistor connected to and located between the voltage line and the inverting terminal; and a second resistor connected to and located between the inverting terminal and the ground, wherein a voltage applied to the inverting terminal is determined based on voltage distribution of the operating voltage by the first resistor and the second resistor, and the voltage applied to the non-inverting terminal is determined as the third current is applied to the third resistor, and wherein a current amount of a second current and a current amount of the third current are equal to each other.

6. The pulse width modulation signal generation circuit of claim 1, wherein the comparison circuit includes:

a selection circuit configured to output one of the first reference voltage and the second reference voltage in response to a selection signal; and a third comparison circuit configured to generate the comparison signal by comparing the voltage of the first node with an output voltage of the selection circuit, wherein the control logic circuit is configured to further determine a level of the selection signal using the level change of the comparison signal, wherein the third comparison circuit is configured to output the comparison signal whose level changes from a first level to a second level when the voltage of the first node becomes greater than the second reference voltage based on the charging operation for the capacitor, wherein the control logic circuit is configured to generate the selection signal indicating the output of the first reference voltage based on the comparison signal whose level has changed from the first level to the second level, and generate the activated charging control signal and a deactivated discharging control signal to perform the charging operation for the capacitor, wherein the third comparison circuit is configured to output the comparison signal whose level changes from the second level to the first level when the voltage of the first node becomes greater than the first reference voltage based on the charging operation for the capacitor, and wherein the control logic circuit is configured to generate the selection signal indicating the output of the second reference voltage based on the comparison signal whose level has changed from the second level to the first level, and output the activated discharging control signal and a deactivated charging control signal to perform the discharging operation for the capacitor.

* * * * *